US008764378B2

(12) United States Patent
Rasmussen et al.

(10) Patent No.: US 8,764,378 B2
(45) Date of Patent: Jul. 1, 2014

(54) CENTRIFUGAL PUMP ASSEMBLY

(75) Inventors: Bjarne Dindler Rasmussen, Tjele (DK); Peter Monster, Randers (DK); Carl-Christian Danielsen, Ryomgard (DK)

(73) Assignee: Grundfos Management a/s, Bjerringbro (DK)

( * ) Notice: Subject to any disclaimer, the term of this patent is extended or adjusted under 35 U.S.C. 154(b) by 695 days.

(21) Appl. No.: 13/012,248

(22) Filed: Jan. 24, 2011

(65) Prior Publication Data

US 2011/0182718 A1 Jul. 28, 2011

(30) Foreign Application Priority Data

Jan. 25, 2010 (EP) .................................... 10000705

(51) Int. Cl.
 *F01D 25/16* (2006.01)
(52) U.S. Cl.
 USPC ........ 415/107; 415/170.1; 415/229; 384/243; 384/420
(58) Field of Classification Search
 USPC ............... 415/104, 107, 170.1, 229; 384/303, 384/306, 420, 424–427, 243; 417/423.12
 See application file for complete search history.

(56) References Cited

U.S. PATENT DOCUMENTS

| | | | | |
|---|---|---|---|---|
| 1,739,362 | A | * | 12/1929 | Albert ........................... 384/303 |
| 2,727,795 | A | * | 12/1955 | Luenberger ................... 384/306 |
| 3,326,612 | A | | 6/1967 | Schaefer |
| 5,094,550 | A | * | 3/1992 | Momose et al. .............. 384/420 |
| 5,302,091 | A | * | 4/1994 | Horiuchi ....................... 417/420 |
| 5,592,016 | A | * | 1/1997 | Go et al. ....................... 257/530 |
| 5,820,271 | A | * | 10/1998 | Hackett, Jr. ................... 384/425 |
| 6,048,168 | A | * | 4/2000 | Sabini ........................... 415/111 |
| 6,295,335 | B1 | * | 9/2001 | Cossard ..................... 378/98.12 |
| 6,884,043 | B2 | * | 4/2005 | Kimberlin et al. ............ 417/355 |
| 2004/0179961 | A1 | * | 9/2004 | Pugnet et al. .............. 417/423.5 |
| 2005/0036895 | A1 | * | 2/2005 | Tremain et al. ............ 417/423.7 |
| 2009/0267435 | A1 | | 10/2009 | Appel |

FOREIGN PATENT DOCUMENTS

EP 2096737 A1 9/2009

OTHER PUBLICATIONS

EP Search Report issued on Jul. 6, 2010 in EP Application No. 10 00 0705.3.

* cited by examiner

*Primary Examiner* — Edward Look
*Assistant Examiner* — Danielle M Christensen
(74) *Attorney, Agent, or Firm* — Panitch Schwarze Belisario & Nadel LLP (57) ABSTRACT

A centrifugal pump assembly with at least one impeller (8) and with a thrust bearing (44) which includes a rotating (50) and a stationary (48) bearing part. The rotating (50) as well as the stationary (48) bearing part are designed in a self-aligning manner.

13 Claims, 9 Drawing Sheets

CENTRIFUGAL PUMP ASSEMBLY

BACKGROUND OF THE INVENTION

The present invention relates to a centrifugal pump assembly according to the preamble of the independent claim(s).

Centrifugal pump assemblies usually comprise an electrical drive motor and a centrifugal pump which is applied thereon and which may be designed in a single-stage or multi-stage manner. The impeller or impellers of the centrifugal pump are arranged on a shaft which is connected to the drive motor. In operation of the centrifugal pump assembly, an axial force acts on the shaft as a result of the reaction force of the delivered fluid, and this axial force must be accommodated by a thrust bearing. Thereby, there are several possibilities with regard the arrangement of such a thrust bearing. The thrust bearing may be arranged at the end of the shaft but also in the middle region of the shaft, which is advantageous with certain pumps.

With the arrangement in the middle region, there is the problem that alignment inaccuracies between the stationary and the moving bearing part of the thrust bearing may occur due to deflections or deformations of the shaft, which then lead to increased frictional losses and, as the case may be, an increased wear. In order to avoid this, a complicated alignment of the shaft and bearing parts is necessary, which however is not always possible in a perfect manner.

With regard to the above problem, it is an object of the present invention to provide a centrifugal pump assembly, with which a reliable functioning of the thrust bearing may be ensured even with a difficult position of installation.

BRIEF SUMMARY OF THE INVENTION

The above object of the present invention is achieved by a centrifugal pump assembly with the features specified in the independent claim(s). Preferred embodiments are to be deduced from the dependent claims, the subsequent description as well as the attached figures.

The centrifugal pump assembly according a preferred embodiment of the present invention comprises at least one impeller and a thrust bearing which accommodates the axial reaction forces produced by the impeller on operation. This thrust bearing, for example, may be arranged on a shaft driving the impeller. The thrust bearing consists of a rotating and of a stationary bearing part, wherein in operation, the axial forces are transmitted from the rotating bearing part onto the stationary bearing part, and the stationary bearing part for its part is supported for example on the housing of the pump or of the drive motor.

According to a preferred embodiment of the present invention, the rotating as well as the stationary bearing part is designed in a self-aligning manner. This means that the stationary and rotating bearing part are designed such that their bearing surfaces may align themselves to one another, such that they extend parallel to one another and may for example come into direct bearing contact with one another, in order to slide on one another in the manner of a sliding bearing. Due to the fact that the rotating as well as the stationary bearing part and not only one of the bearing parts, is designed in a self-aligning manner, a reliable mounting is possible even with position errors or deflections of the shaft, since the bearing surfaces of the two bearing parts may always assume an angular position parallel to one another, in which position they reliably slide on one another. A wobbling of one of the bearing parts is thus reliably prevented.

Preferably, such a thrust bearing is suitable for an arrangement in the middle of the shaft. Thus, preferably, the thrust bearing is arranged on a drive shaft distanced to the axial ends of the drive shaft, and in particular it is situated closer to the axial middle of the drive shaft than towards the axial ends. This means that with this embodiment, the thrust bearing lies in the region of the drive shaft, in which slight radial deflections of the shaft and positional errors of the shaft may occur, more that at the axial ends of the shaft, where the shaft is usually mounted in a radial manner. The arrangement of the thrust bearing in this region usually results in the problem of the bearing parts beginning to wobble, which causes an increased friction and an increased wear. This is avoided due to the self-aligning design of the two bearing parts, according to the present invention, and low-friction and low-wear running is also ensured with an arrangement of the thrust bearing in this middle region of the shaft.

Preferably, a rotor of an electrical drive motor and at least one impeller are arranged on the drive shaft, wherein the thrust bearing in the axial direction is situated between the rotor and the at least one impeller. Thereby, the drive shaft may be designed as a continuous, single-part drive shaft, but may also be designed in a multi-part manner, for example in the form of a motor shaft and a pump shaft which are connected to one another in a rotationally fixed manner. Preferably, the thrust bearing is thus arranged on the axial end of the centrifugal pump which faces the drive motor.

Further preferably, in the case of a multi-stage centrifugal pump, the thrust bearing is arranged at the pressure side of the at least one impeller or of an arrangement of several impellers. The pressure side is that side of the impeller, at which the fluid to be delivered has a higher pressure. This means that preferably the thrust bearing is arranged in the region of the pump, in which the highest fluid pressure prevails. This has the advantage that an adequate lubrication of the thrust bearing by way of the fluid may be ensured in this region. This is particularly the case with the delivery of fluids or liquids which tend to evaporate with heating and/or slight pressure. By way of the arrangement in the region of the highest pressure, one ensures that in this region, the fluid to be delivered is present in the liquid aggregate state, and one may thus ensure an adequate lubrication of the thrust bearing. This is of particular significance when the fluid to be delivered is a refrigerant for example, which evaporates already at low temperatures. Preferably, the region of the highest pressure of the centrifugal pump lies at the axial end of the centrifugal pump which faces the drive motor. This means that the suction side of the pump is distanced to the drive motor in the axial direction. The thrust bearing thereby preferably lies in front of the drive motor, so that the fluid to be delivered in this region is essentially not yet heated by the waste heat of the drive motor. In the ideal case, the thrust bearing thus lies in a region of a high pressure and low temperature of the fluid to be delivered, so that in this region it is ensured that the fluid is not evaporated and may lubricate the bearing in liquid form.

As described above, the thrust bearing is preferably designed as a sliding bearing and is lubricated by the fluid or liquid to be delivered.

Further preferably, a bearing surface of at least one bearing part is freely pivotable at least in a limited angular range for the alignment in its angular position to the rotation axis of the drive shaft. The self-alignment is ensured by way of this, i.e. the bearing surface may pivot in its angular position with respect to the rotation axis, and with regard to the angle, may align itself such that it comes to bear on the opposite bearing surface of the other bearing part in a plane manner. Thus, a wobbling may be prevented in operation.

For this, further preferably, the bearing surface of at least one bearing part, for the alignment in its angular position, is pivotable about two axes which extend at right angles to one another and normally to the rotation axis of the drive shaft. This means that this essentially represents a pivoting on a spherical plane whose middle point lies on the rotation axis. Thus, the bearing surface may freely align itself in all directions in its angular position.

Preferably, the bearing surface at least of one bearing part is attached or supported on a carrier which comprises a spherical contact surface which is away from the bearing surface and which bears in a sliding manner on a corresponding conical counter-contact surface. Thereby, the spherical contact surface is preferably curved in a convex manner, and the conical counter-contact surface is designed in a corresponding concave manner. Thereby, the counter-contact surface is concavely curved preferably with the same radius, i.e. is designed in a spherical manner, so that the surfaces come to bear on one another in a surfaced manner. The contact surface and counter-contact surface thus form parts of a ball surface and permit the previously described pivoting of the bearing surface in its angular position relative to the rotation axis. The conical counter-contact surface does not necessarily need to be designed in a spherical manner, but instead it may also be designed conically with a straight cross-sectional line, wherein the diameter and gradient of the cone are selected such that the spherical contact surface may come to bear on the conical counter-contact surface at least in a linear manner. The bearing surface may be designed directly on the carrier, which means that the carrier itself is designed of the desired bearing material. Alternatively, it is possible to provide the carrier as a separate component, on which at least one bearing element of a suitable bearing material is arranged, on which the actual bearing surface is formed.

Further preferably, the contact surface and the counter-contact surface at least of one bearing part, preferably of the rotating bearing part, are held in bearing contact by way of spring force. This has the advantage that even with a standstill of the pump, one may retain the assumed angular position of the bearing surface by way of a relative pivoting of the contact surface and counter-contact surface to one another, since the contact surface and the counter-contact surface are held in bearing contact with a certain friction fit.

Moreover, usefully engagement elements are arranged on the contact surface and the counter-contact surface and are engaged with one another for torque transmission. The contact surface and the counter-contact surface should slide on one another, in order to change the angular position of the bearing surface. As described above, this essentially consists of a pivoting about two pivot axes which are orthogonal to one another and which cross the rotation axis of the drive shaft. A pivoting or rotating about the rotation axis between the contact surface and the counter-contact surface is however undesirable, since this is the movement which in the thrust bearing is to be effected between the bearing surfaces of the two bearing parts. These should slide on one another in a rotating manner. Inasmuch as this is concerned, a rotation between the contact surface and the counter-contact surface is to be prevented. The engagement elements may for example be designed in the form of engagement projections and corresponding engagement grooves, wherein the engagement projections for example are formed on the contact surface and the engagement grooves in the counter-contact surface. The engagement projections and engagement grooves thereby preferably extend on the radial direction, so that the engagement projections may move into the engagement grooves on pivoting the contact surface relative to the counter-contact surface. A movement in the peripheral direction relative to one another is however prevented. Thus, a torque between the contact surface and the counter-contact surface may be ensured by way of the positive-fit engagement of the engagement elements.

The contact surface and/or the counter-contact surface are preferably manufactured of a ceramic material. These materials have an adequate strength and in particular a high wear-resistance.

Further preferably, one of the bearing parts comprises a bearing surface which is formed by several individual bearing shoes, and the other bearing part comprises a continuous bearing surface, on which the bearing shoes slide. Thus, for example, the stationary or fixed bearing part may comprise several individual bearing shoes, while the rotating bearing part has an annular, continuous bearing surface which is preferably manufactured as a single component. Thereby, however, one may provide grooves or recesses in the surface in the continuous bearing surface, in order to ensure the supply of the fluid to be delivered by the pump, for lubricating the bearing. The individual bearing shoes on the other bearing part may have certain movability, so that with their surfaces they may likewise align themselves relative to the oppositely lying bearing surface, so that the bearing surfaces come to bear on one another in a plane manner. Free spaces or gaps may remain between the individual bearing shoes, and these likewise serve for the supply of the fluid to be delivered or the liquid to be delivered, for lubricating the bearing. Also suitable recesses or grooves may be provided in the bearing surfaces on the bearing shoes, for the supply of lubricant.

As described above, the centrifugal pump assembly is particularly preferably designed for delivering a refrigerant. It is indeed with such a centrifugal pump assembly that it is desirable to arrange the thrust bearing on the pressure side of the centrifugal pump, i.e. in the axial middle region of the shaft, wherein the quality of the mounting is improved by the inventive design of the thrust bearing in the manner described above. Such a refrigerant centrifugal pump assembly is applied for example for the circulation of the refrigerant in a refrigeration installation or air conditioning installation. Preferably, the centrifugal pump assembly is designed in a multi-stage manner with a plurality of impellers arranged in series, for the pressure increase.

The drive motor of the centrifugal pump assembly is preferably designed as a can, i.e. as a wet-running electrical drive motor. This has the advantage that the number of necessary seals may be kept small. In particular, no shaft seals are necessary so that a leakage risk, which is of a particular problem with the delivery of, as the case may be, toxic or environmentally harmful refrigerants, is avoided.

According to a preferred embodiment of the present invention, one envisages the centrifugal pump being surrounded by a tubular container. This tubular container surrounds the centrifugal pump as an additional wall, preferably radially distanced to the first housing walls of the individual pump stages of the centrifugal pump. The tubular container, with a first axial end, at which it is formed in an open manner, is sealingly connected to the housing of the drive motor. At its opposite axial end, the tubular container is designed in a closed manner, so that as a whole it has a pot-like shape. The container closes the complete system to the outside and accommodates the forces produced by the system pressure of the fluid in its inside. For sealing, only a single seal in the region of the interface to the motor housing is necessary. Inasmuch as this is concerned, the danger of leakage is reduced by way of the reduction of the interfaces which are to be sealed. Moreover, the housing parts of the individual pump stages of the centrifugal pump do not need to be designed in a pressure-tight manner to the extent that they may accommodate the system pressure, but these housing parts need only withstand the differential pressure which is produced by the centrifugal pump or its individual pump stages. Inasmuch as this is concerned, one may make do without expensive cast parts in this region. Since the complete container surrounding the centrifugal pump is preferably filled with the refrigerant to be delivered, the system pressure then prevails within as well as outside the housing of the pump stages of the centrifugal pump assembly. Moreover, also no greater demands are placed on the seals in the inside of the centrifugal pump, since these do not need to hermetically seal the centrifugal pump to the outside towards the surroundings. This function is assumed by the surrounding container.

Preferably, the tubular container comprises a suction connection and pressure connection. Apart from the opened, axial end-side which is connected to the motor housing, these two openings are preferably the only further openings in the container, so that the container is relatively easily to seal to the outside, in this case at only three interfaces. However, it is also conceivable, depending on the installation into which the container is to be installed, to possibly also provide more than one suction connection and/or more than one pressure connection on the container. In the inside of the container, the suction connection is connected to the suction side of the centrifugal pump, and pressure connection is connected to the pressure side of the centrifugal pump.

Preferably, the suction connection and/or pressure connection extend away from the container in the radial direction, and these thus form connection unions for connection to connecting conduits.

The container moreover comprises a closed wall. Preferably, the wall is designed as one part or as one piece, as the case may be by way of welding several components. The thus formed closed container, apart from the open end-side for the connection of the motor, and the suction and pressure connections, thus preferably has no further openings or interfaces to be sealed, by which means the leakage danger is minimized.

The suction connection and/or the pressure connection may be provided with connection flanges for connection to connecting pipe conduits. Alternatively, the suction connection and/or the pressure connection may be designed for the direct welding to connection conduits. If connecting conduits are welded directly to the suction connection and/or to the pressure connection, this has the advantage that no further seals need to be provided on these connections, by which means the danger of leakage is further minimized. In the case that connection conduits are welded directly to the suction connection and pressure connection, in the ideal case thus merely only one opening on the container, which is to be sealed, remains, specifically the interface to the drive motor. The suction connection and the pressure connection may be designed as a connection union. Alternatively, the connection conduits may also be welded directly to the peripheral wall of the container.

Further preferably, the container, in its inside, comprises an annular separating wall, which separates the suction side and the pressure side of the centrifugal pump from one another.

This annular separating wall extends preferably as an annular projection from the inner wall radially inwards. The annular separating wall thereby, seen in the axial direction of the container, i.e. in the direction of the rotation axis of the centrifugal pump, is preferably arranged between the suction connection and the pressure connection in the container. The annular separating wall at its inner periphery is preferably further designed such that it sealingly comes to into bearing contact with the outer periphery of a housing part of the centrifugal pump arranged in the inside of the container. Here, as the case may be, one may provide a seal, for example an O-ring. Thereby, the separating wall is preferably placed in the axial direction, such that the centrifugal pump with its suction-side axial end engages into the inner periphery of the separating wall, and with the suction-side axial end bears on the separating wall in a sealing manner. At the side of the separating wall which is away from the suction wall side, the free space between the centrifugal pump and the surrounding container is filled with the fluid exiting from the centrifugal pumps. This space is then preferably connected to the pressure connection. Preferably, thus a free space remains between the centrifugal pump and the inner periphery of the container, i.e. the container has an inner diameter which is larger than the outer diameter of the centrifugal pump.

The centrifugal pump extends preferably concentrically to the container and is inserted in the axial direction, i.e. in the direction of the longitudinal axis or rotation axis of the centrifugal pump, from the open end-side, into the container. Thereby, the container is preferably releasably connected to the motor housing of the drive motor, for example by way of a screwed flange connection. This permits the container and the motor housing to be able to be separated from one another, wherein then the drive motor with the centrifugal pump assembly may be removed from the container or pulled out of this, for example in order to service or exchange the centrifugal pump or the drive motor. Inasmuch as this is concerned, as very simple servicing and, as the case may be, a simple repair is possible, since all connection conduits for the connection of the centrifugal pump assembly to remaining parts of a refrigeration system do not need to be released, but may remain fixedly connected to the container.

If the drive motor is designed as a canned motor, the can is further preferably arranged such that it is directly sealed with the open axial end of the container or is connected in a sealed manner to a flange for the connection of the drive motor to the container. For example, the can may be welded to such a flange on the drive motor or on the motor housing. This has the advantage that also no further seals for sealing the inner space filled with refrigerant and being under the system pressure are required in the drive motor. Thus, in the ideal case, only a single seal is necessary between the motor housing or the drive motor on the one hand and the container on the other hand.

In particular no shaft seals which are particularly liable to leakage are required with the design as a canned motor.

As previously described, the container is preferably designed in a pressure-tight manner for the system pressure of the refrigerant to be delivered. Particularly preferably, the container therefore is designed such that it withstands a system pressure greater than (">") 25, further preferably >30 and in particular >50 or 60 bar inner pressure.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "front" and "rear" designate directions in the drawings to which reference is made. The word "inwardly" refers to a direction toward the geometric center of the assembly, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Figure 1:
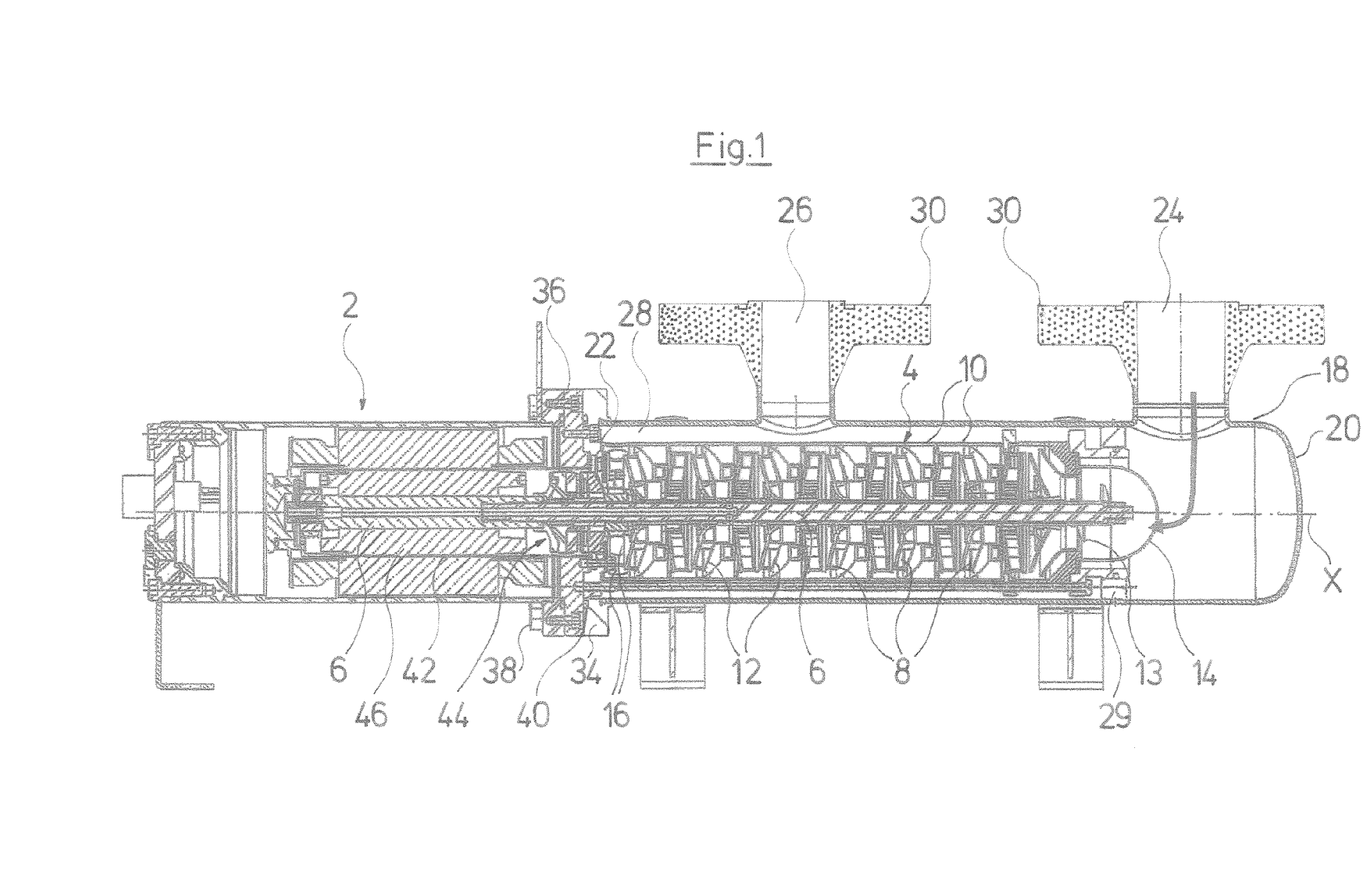
FIG. 1 is a sectioned view of a centrifugal pump assembly for delivering a refrigerant according to a first preferred embodiment of the present invention.
Figure 2:
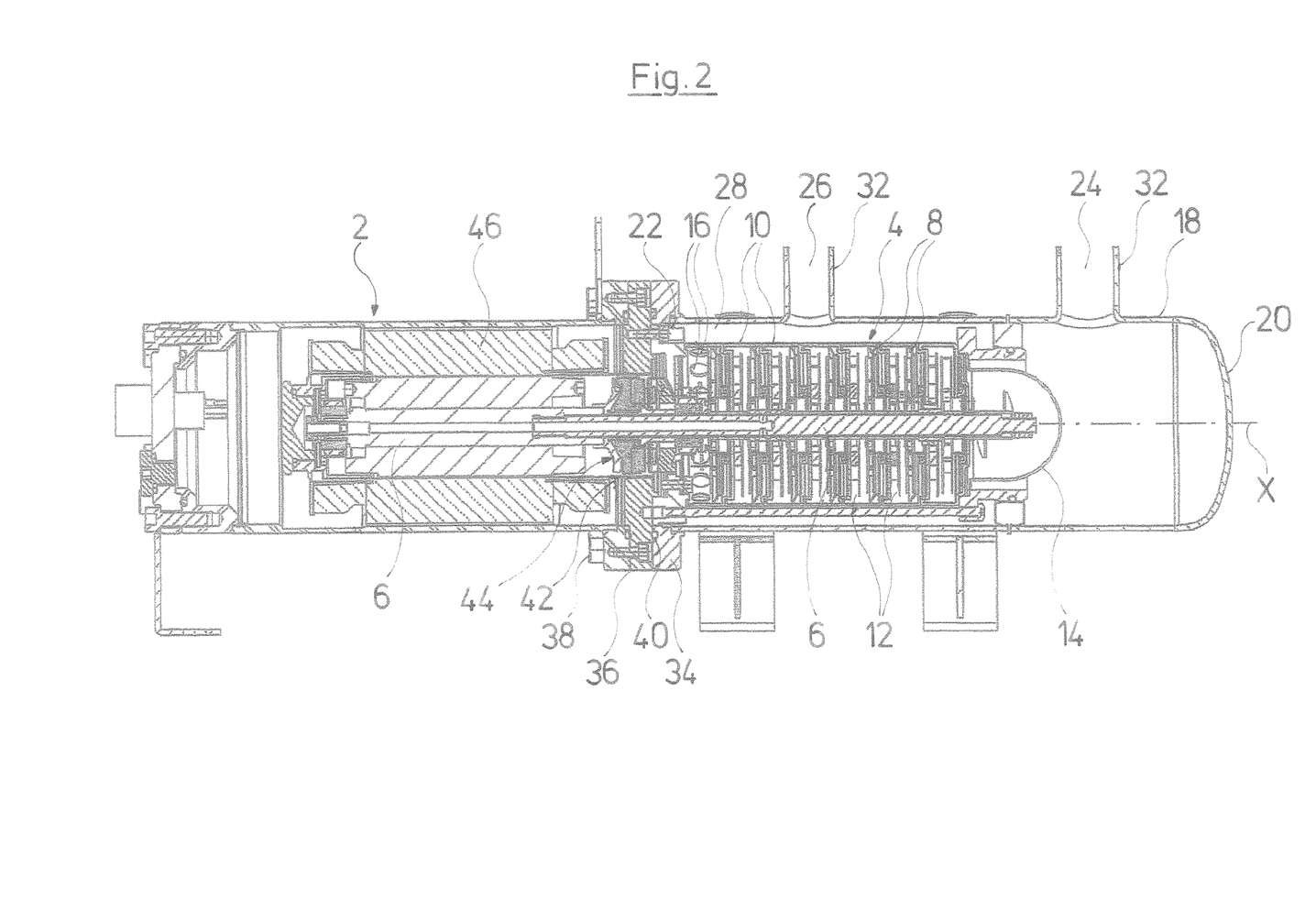
FIG. 2 is a sectioned view of a centrifugal pump assembly for delivering a refrigerant according to a second preferred embodiment of the present invention.
Figure 3:
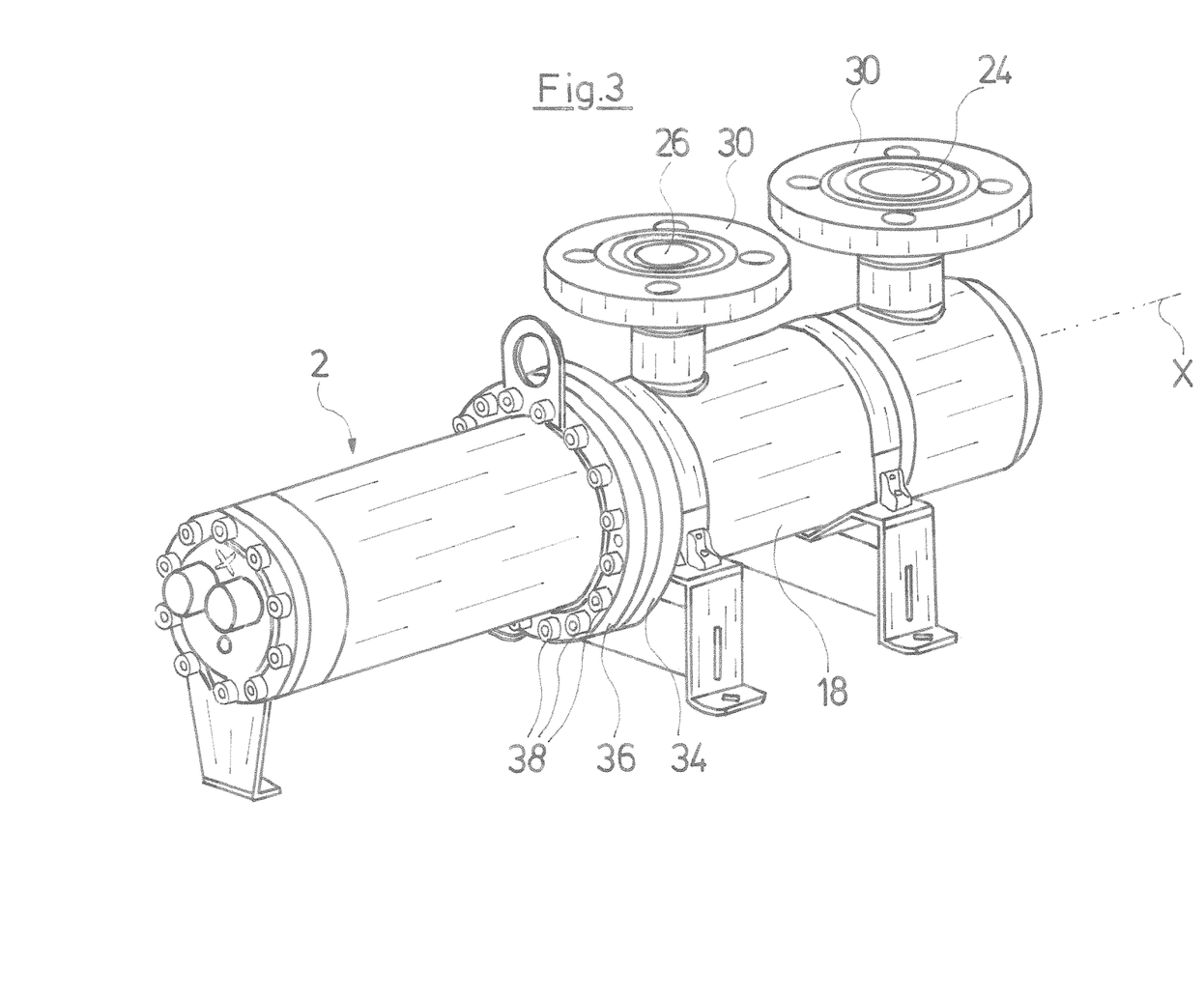
FIG. 3 is an perspective view of the entire centrifugal pump assembly according to FIG. 1.

Referring to the drawings in detail, wherein like numerals indicate like elements throughout the several views, the centrifugal pump assemblies shown in the FIGS. 1 and 2 are designed especially for the delivery of refrigerants and at an axial end comprise a drive motor 2 onto which a centrifugal pump 4 is applied at the axial side, i.e. in the direction of the rotation axis X. The centrifugal pump 4 is designed in a multi-stage manner, i.e. it comprises a multitude of impellers 8 which are arranged behind one another in the axial direction, on the drive shaft 6. The impellers 8, as are known from conventional centrifugal pumps, are surrounded by housing parts 10 with inner-lying guide vanes 12. The guide vanes 12 serve for leading the flow from one impeller 8 to the next, and for deflecting the flow exiting radially from the impeller 8, in the axial direction.

The housing parts 10 are applied onto one another in the axial direction X, so that together they form a tubular housing. A filter 14 is arranged at the first axial end 13 of the centrifugal pump 4 which forms the suction side, through which filter the refrigerant to be delivered is suctioned by the centrifugal pump 4 and enters into this. At the opposite pressure-side axial end, peripheral exit openings 16 are arranged in the last housing part 10, through which openings the refrigerant delivered by the centrifugal pump 4 exits radially out of the centrifugal pump 4.

On delivering refrigerants, there exists the problem that these are usually delivered under a high system pressure. The total system pressure of a refrigerant system may be more that 50 bar, while the differential pressure between the suction side and the pressure side of the centrifugal pump 4 may be significantly lower, for example may lie in the region between 2.5 and 6 bar. The high system pressure however necessitates the centrifugal pump assembly being designed in an adequately pressure-resistant manner. It is particularly with the delivery of refrigerants that leakages are to be avoided at all events, since such refrigerants are often expensive, environmentally harmful and/or are toxic, so that their exit into the surroundings is to be avoided at all costs.

In order to design the centrifugal pump assembly in an adequately sealed and pressure-resistant manner, the centrifugal pump 4 is arranged in a surrounding pressure-resistant container 18. The container 18 is designed in a tubular manner and is closed at its end 20 which is away from the drive motor 2. Thus, as a whole, a pot-like container shape is achieved. The container comprises only three openings. These are one opening 22 which is formed by the end-side of the container 18 which is away from the axial end 20, as well as a suction opening 24 and a pressure opening 26. Otherwise, the container wall is designed in a completely closed manner. The container 18 may be welded in particular in a pressure-tight manner in the remaining regions. The refrigerant to be delivered is suctioned through the suction opening 24 and then enters through the filter 14 into the centrifugal pump 4. The refrigerant which is delivered by the stages of the centrifugal pump then exits through the exit openings 16 at the opposite axial end of the centrifugal pump 4. Subsequently, it flows through the gap 28 between the outer side of the housing parts 10 and the inner periphery of the container 18 to the pressure opening 26, through which it then exits out of the centrifugal pump assembly. For forming the gap 28, the inner diameter of the container 18 which preferably has a circular cross section with respect to the rotation axis X, is designed larger than the outer diameter of the housing parts 10.

A ring 29 is arranged in the inside of the container 18 on the inner wall, and forms a separating wall in the gap 28 and separates the pressure side from the suction side. The ring 29 bears in a sealing manner on the axial end 13 of the tubular housing formed from the housing parts 10. For this, an O-ring is provided for sealing. Thus, one prevents fluid from flowing from the pressure side in the gap 28 into the suction side and into the opening at the axial end 13 of the centrifugal pump 4. The ring 29 is connected, in particular welded to the container wall in a fixed and sealed manner.

With the example shown in FIG. 1, the suction opening 24 and the pressure opening 26 are surrounded by flanges 30, by way of which the centrifugal pump assembly may be connected to adjacent connection conduits. Thereby, in each case, a sealing element for sealing is applied between the flanges 30 and the counter-connection flanges (not shown) which bear on these. It is also possible to weld the container 18 directly to the connecting pipe conduits, in order to avoid such a sealing. The preferred embodiment according to FIG. 2 is provided for this, with which the suction opening 24 and the pressure opening 26 are merely formed by tubular unions 32 which extend radially away from the container 18 and which may be directly welded to the connecting conduits. Alternatively, it would also be conceivable to weld the connecting conduits directly to the container 18. Connection locations which are to be sealed and which form a potential leakage risk are avoided in this manner.

A flange 34 is arranged surrounding the opening 22, at the axial end of the container 18 and is welded peripherally to the wall of the container 18. This flange 34 serves for the connection to the drive motor 2 which for this, at its axial end facing the centrifugal pump 4, comprises a counter-flange 36 which is screwed to the flange 34 by way of screws 38. An O-ring 40 is arranged between the flange 34 and counter-flange 36 for sealing.

Figure 4:
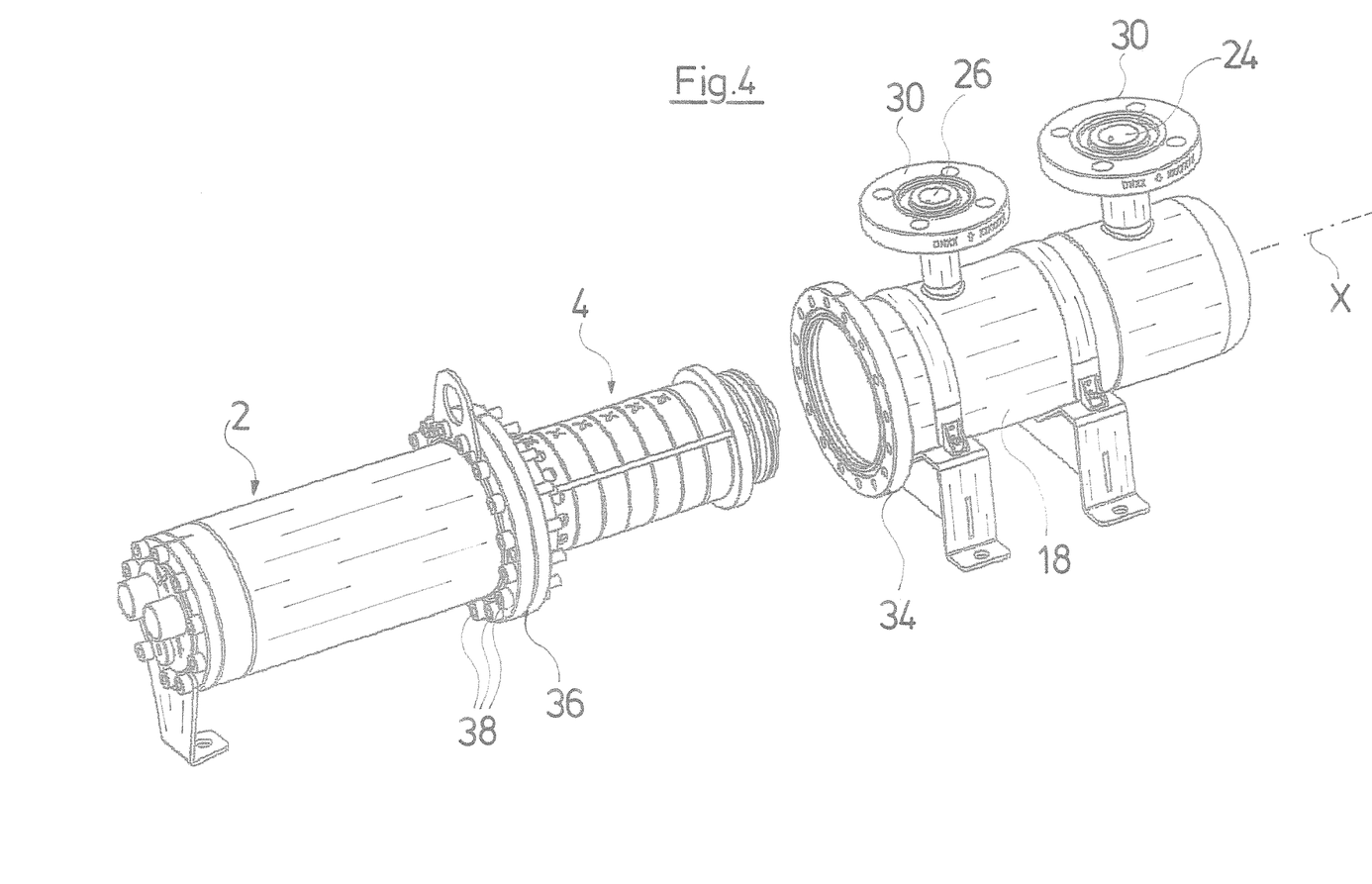
FIG. 4 is a perspective view of the centrifugal pump assembly according to FIG. 3 in an opened condition.

The drive motor 2 is designed as a canned motor, wherein its can 42 at its open end which faces the centrifugal pump 4, is connected in a sealed manner to the counter-flange 36, preferably welded to this. By way of this design, one succeeds in the complete centrifugal pump assembly, apart from the suction openings 24 and 26, having only one interface, at which the inner space to be sealed to the outside, specifically between the flange 34 and the counter flange 36 in the region of the connection between the drive motor 2 and the container 18. In the case that the suction connections 24 and 26, as with the embodiment example according to FIG. 2, are also connected to connecting pipe conduits by way of welding, thus only a single seal is required for sealing the pressure space to the outside. The risk of leakage is minimized by way of this. Moreover, for maintenance purposes, it is very easily possible to remove the complete centrifugal pump 4, as is shown in FIG. 4, from the container 18 in the axial direction X after the release of the screws 38. Thus the complete centrifugal pump 4 including the drive motor 2 may be very easily exchanged.

A further inventive particularity of the shown centrifugal pump assembly lies in the design of the thrust bearing 44 which is described in detail by way of the FIGS. 5-9.

As is to be recognized in FIGS. 1 and 2, the thrust bearing 44 is arranged in the middle region of the drive shaft 6, i.e. it is distanced from the two axial ends of the drive shaft 6 and is situated closer to the axial middle of the drive shaft 6 than to its axial ends. The thrust bearing 44 thus lies between the centrifugal pump 4 and the rotor 46 of the drive motor 2, which is likewise fastened on the drive shaft 6. For this, in the example shown here, the drive shaft 6 is designed in a two-part manner, and the part of the shaft in the rotor 2 is separate from the part of the drive shaft 6 in the centrifugal pump 4. Both parts are connected one another in a rotationally fixed manner. It is to be understood however that here to one may also apply a single-part drive shaft 6.

The position of the thrust bearing 44 at the end of the centrifugal pump 4 facing the drive motor 2 has the advantage that the thrust bearing 44 which is lubricated by the delivered refrigerant, is situated in the region of the centrifugal pump, in which the highest pressure of the refrigerant prevails. Simultaneously, the thrust bearing however is still distanced to the rotor 46 of the drive motor 2, so that the delivered refrigerant in this region is not yet excessively heated by the waste heat of the drive motor 2. This means that the thrust bearing 44 lies precisely in the region, in which the refrigerant does not evaporate due to the high pressure and the not yet effected heating by the drive motor, so that here a reliable liquid lubrication of the thrust bearing 44 remains ensured.

Figure 5:
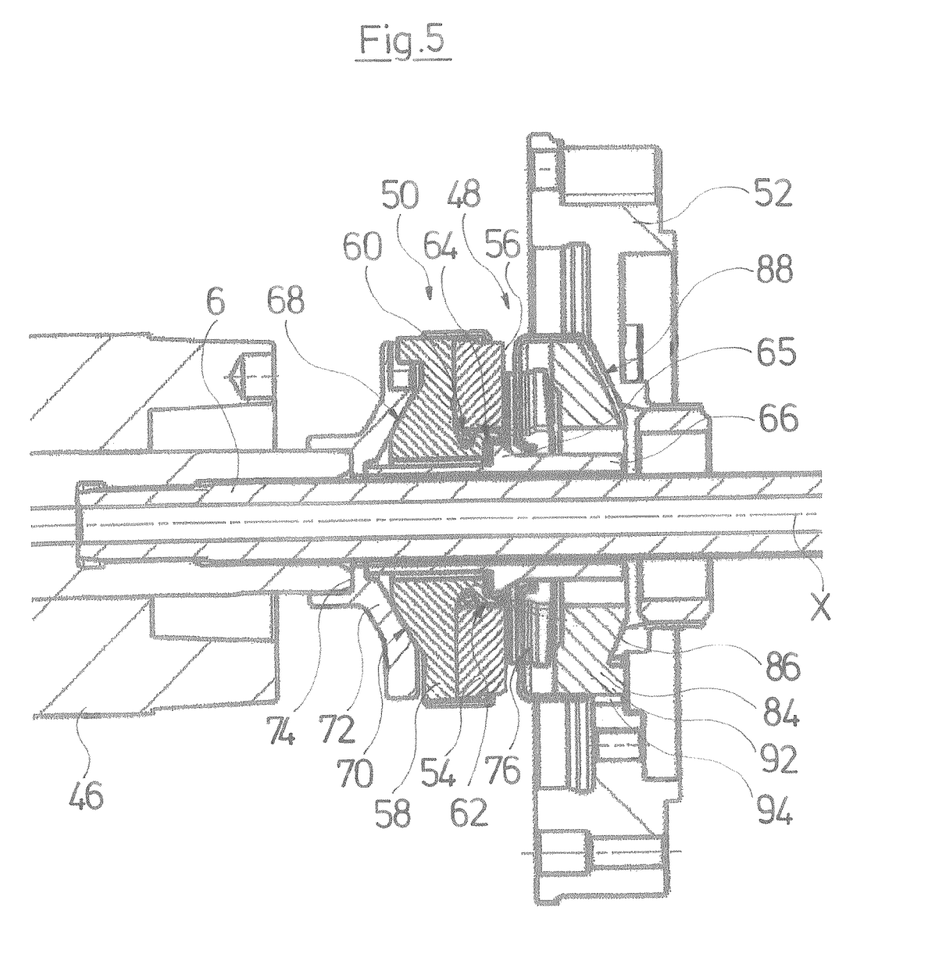
FIG. 5 is an enlarged view of the design of a thrust bearing in the centrifugal pumps according to the FIGS. 1 and 2.

Usually the problem of the parts of a thrust bearing tending to wobble on account of possible radial deflections of the drive shaft arise in the middle region of the drive shaft 6, in which the thrust bearing 44 is arranged. According to a preferred embodiment of the present invention, this is avoided by way of the thrust bearing being designed in a self-aligning manner. The thrust bearing consists of two bearing parts 48 and 50, specifically of a stationary bearing part 48 and a rotating bearing part 50. The rotating bearing part 50 is connected to the shaft 6 in a rotationally fixed manner, while the stationary bearing part 48 is situated in a rotationally fixed manner in a housing part 52 which is screwed to the counter-flange 36. The stationary bearing part 48 as well as the rotating bearing part 50, are designed in a self-aligning manner.

Figure 6:
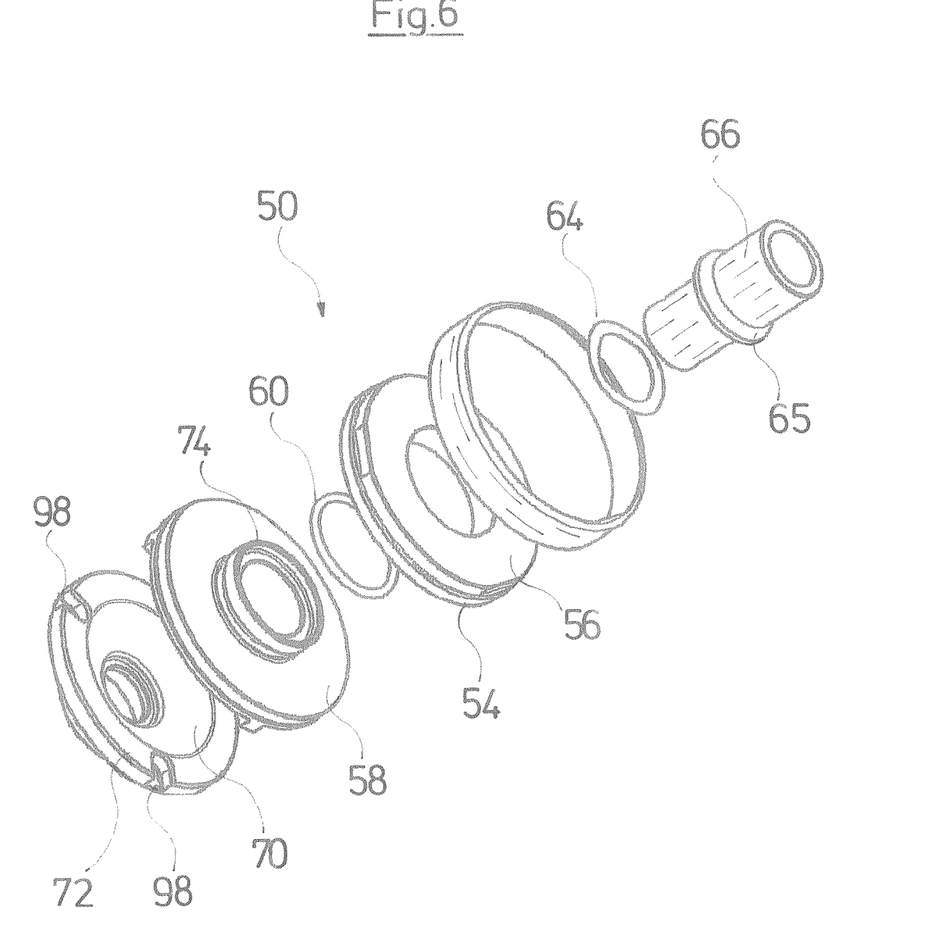
FIG. 6 is an exploded perspective view of a first rotating bearing part of the thrust bearing according to FIG. 5.
Figure 7:
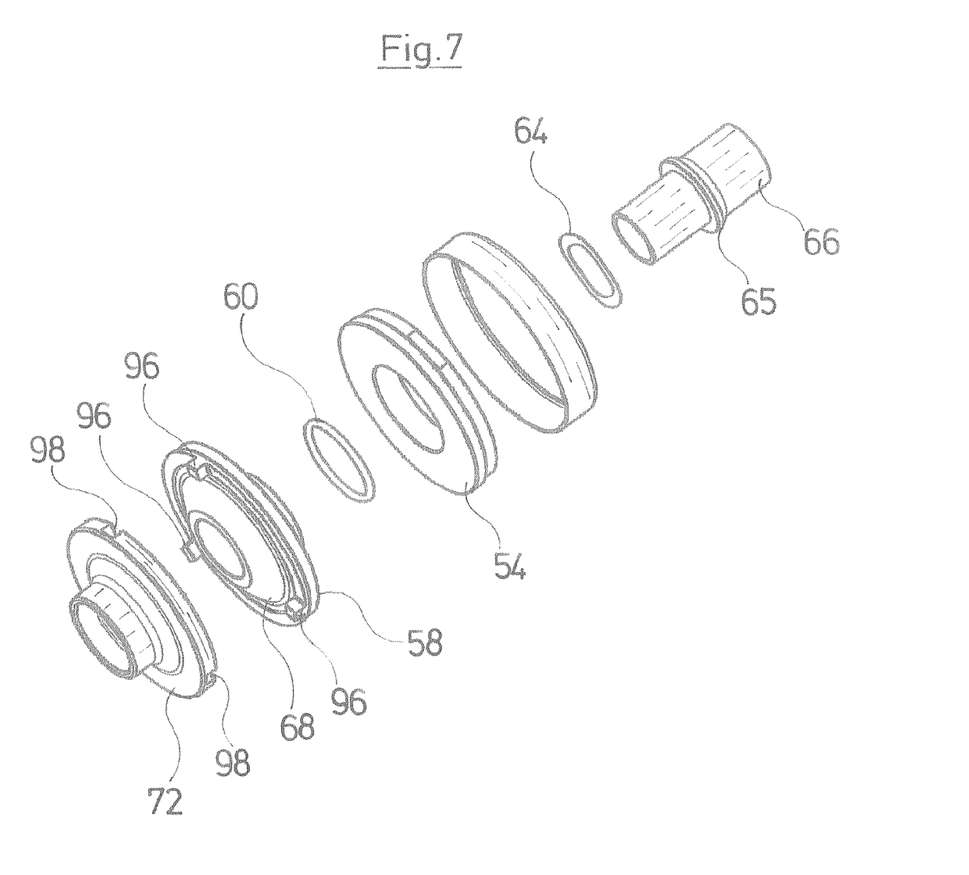
FIG. 7 is an exploded perspective view of a stationary bearing part according to FIG. 6 shown in a different axial direction.

The rotating bearing part 50 comprises an annular bearing element 54 of a suitable bearing material, for example of a ceramic material. A first bearing surface 56 is formed on the bearing element 54 at an axial side with respect to the rotation axis X. The bearing element 54 is held on a carrier 58, wherein it is centered via an O-ring 60. The O-ring 60 thereby is arranged peripherally of a projection 62 of the carrier 58 which engages into the inner periphery of the annular bearing element 54, so that the O-ring 60 comes to bear on the inner periphery of the bearing element 54. The bearing element 54, with the axial rear-side which is away from the bearing surface 56, comes to bear on the carrier 58 in a plane manner. The carrier 58 is supported via a wave-like spring disk 64 on a radially projecting shoulder 65 of a sleeve 66, wherein the sleeve 66 is fixed on the drive shaft 6.

The rear-side surface of the carrier 58 which is away from the bearing element 54 is designed as a spherical contact surface 68. This means that the contact surface 68 has the shape of an annular ball section, wherein the middle point of this ball lies on the rotation axis X. The contact surface 68 lies on a conical, in this case, correspondingly spherically shaped counter-contact-surface 70 which is designed in a support body 72. The counter-contact surface 70 in this case has the same curvature, i.e. the same radius as the contact surface 68. Thereby, the contact surface 68 is shaped in a convex manner and the counter-contact surface 70 is shaped in a concave manner. The support body 72 in turn is supported on an annular projection 74 on the drive shaft 6. In the example shown here, the projection 74 is formed by the axial end of the shaft section of the drive shaft 6 which forms the rotor shaft of the rotor 46. Thereby, the projection 74 of the shoulder 65 is directed in an opposite manner, so that the support body 72 and the carrier 58 are clamped between the shoulder 65 and the projection 74 by the spring effect of the spring disk 64, and the contact surface 68 and the counter-contact surface 70 are held in bearing contact by this spring force.

Due to the spherical shape of the contact surface 68 and the counter contact surface 70, it is possible for the carrier 58 to be pivoted about the middle point of the spherical shape of the contact surface 68 and the counter-contact surface 70, so that the angular position of the bearing surface 56 with respect to the rotation axis X about two axes which are orthogonal to one another and to the rotation axis X, may be changed. In this manner, the bearing surface 56 may align itself automatically and freely in its angular position to the rotation axis X, wherein the contact surface 68 slides on the counter-contact surface 70. By way of the spring effect of the spring disk 64, one ensures that even with a standstill of the pump, when the axial force which acts on the thrust bearing on operation is no longer present, the contact surface 68 and the counter-contact surface 70 are fixed on one another, so that an angular position of the bearings surface 56 which is previously automatically set, is also retained with a standstill of the pump.

Figure 8:
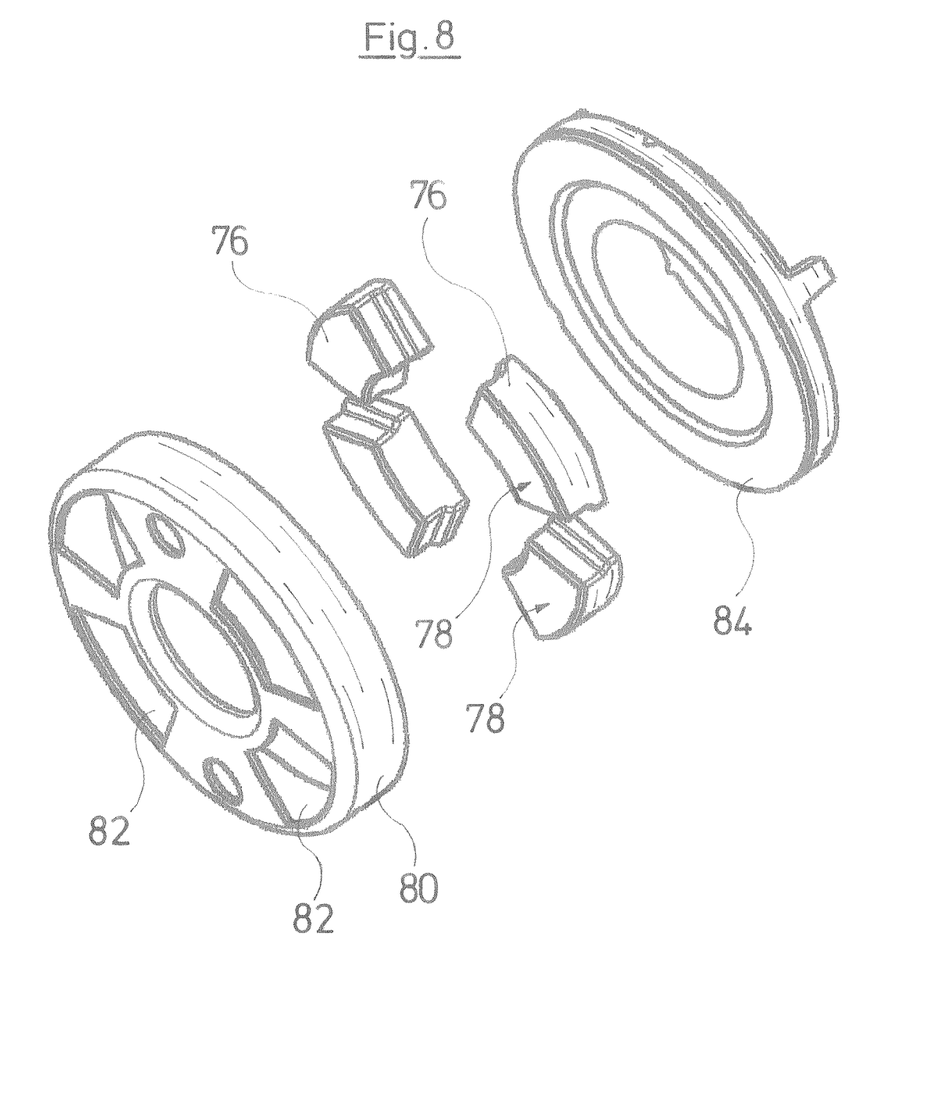
FIG. 8 is an exploded perspective view of the stationary bearing part of the thrust bearing according to FIG. 5.
Figure 9:
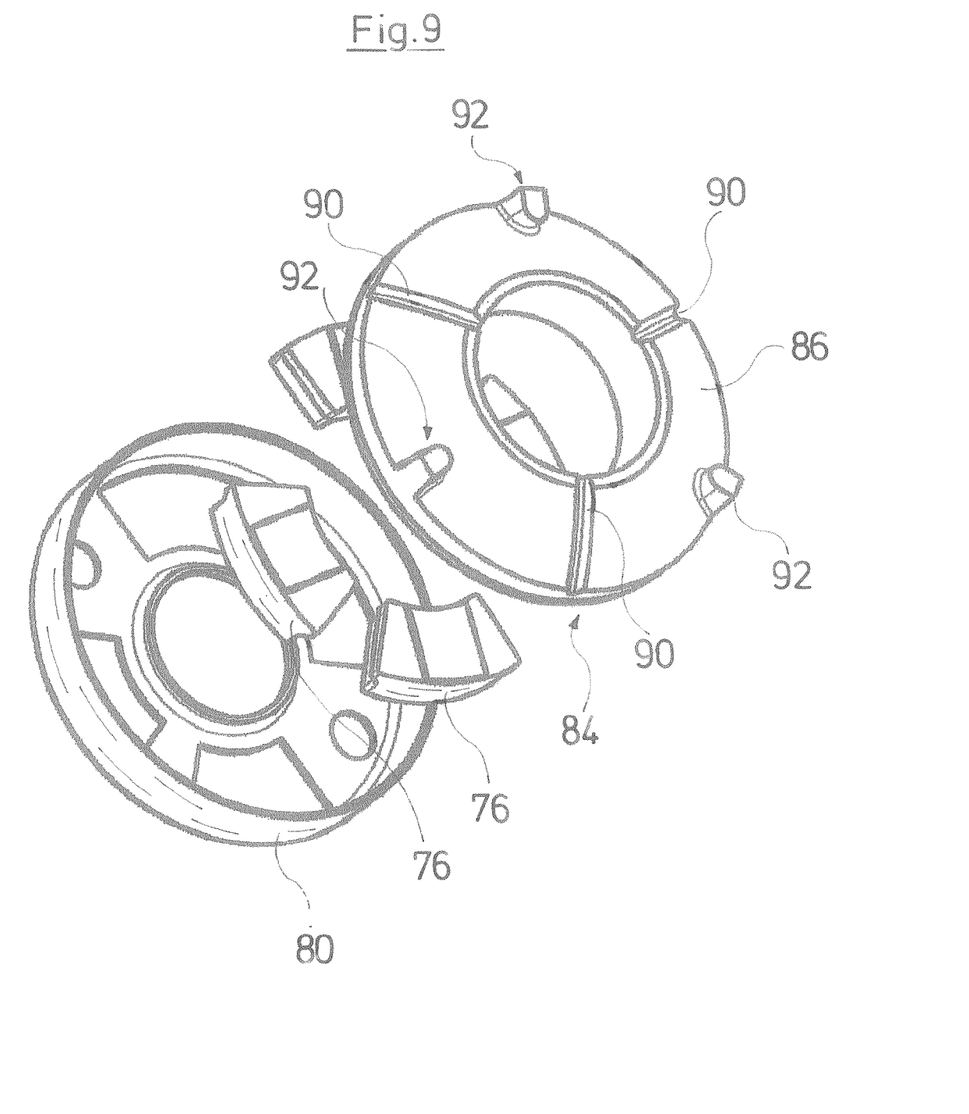
FIG. 9 is an exploded perspective view of the stationary bearing part according to FIG. 8 shown in a different axial direction.

Even the stationary bearing part 48 is designed in a self-aligning manner. The stationary bearing part 48 comprises several bearing shoes 76, whose axial surfaces form two bearing surfaces 78, which are in bearing contact with the first bearing surface 56 in a sliding manner. The bearing shoes 76 are fixed in a holding ring 80 which comprises recesses 82 which correspond to the outer contour of the bearing shoes 76. Thus, the bearing shoes 76 may extend through the recesses 82 and are fixed in the holding ring 80 in the radial and peripheral direction. The bearing shoes 76 bear on a carrier 84 at the axial side which is away from the bearing surfaces 78. The carrier 84 at its axial side which is away from the bearing shoes 76, has a spherical contact surface 86. This spherical contact surface 86 forms an annular section or cut-out of a spherical surface, wherein the middle point of the sphere is situated on the rotation axis X. The contact surface 86 bears on a counter-contact surface 88 which is formed in the housing part 52. The counter-contact surface 88 is designed in a conical manner and in this case in a correspondingly spherical manner, i.e. it has the same radius of curvature and is curved about the same middle point as the contact surface 86. The contact surface 86 thereby is curved in a convex manner while the counter-contact surface 88 is curved in a concave manner. This design permits the carrier 84 to be pivoted about the middle point of the spherical shape defining the contact surface 86 and the counter-contact surface 88. Thus, it is possible for the bearing surfaces 78 on the bearing shoes 76 to align themselves automatically with regard to their annular position with respect to the rotation axis X. This means that the bearing surfaces 78 may freely pivot about two pivot axis which are orthogonal to one another and which extend normally to the longitudinal axis X, in a certain angular range. In this manner, the bearing surfaces 78 may always bear on the bearing surface 56 of the rotating bearing part in a plane manner, so that a sliding contact without a wobbling of the bearing surfaces is always given.

As is to be recognized in FIG. 9, three radially extending grooves 90 which are distributed uniformly over the periphery and which improve the fluid circulation and thus the lubrication in the thrust bearing, are formed in the contact surface 86.

Three engagement projections 92 which extend in the radial direction, are distributed uniformly on the outer periphery of the contact surface 86 and engage in corresponding recesses 94 in the housing part 52, are formed on the outer periphery of the contact surface 86, in order to hold the carrier 86 on the housing part 52 in a rotationally fixed manner. Thereby, so much play is present, in particular in the radial direction between the engagement projections 92 and the recesses 94, that the described pivoting or aligning movement remains possible between the contact surface 86 and the counter-contact surface 88.

Accordingly, the carrier 58 is mounted on the support body 72 in a rotationally fixed manner, so that a torque may be transmitted from the support body 72 onto the carrier 58. For this, radially extending engagement projections 96 are arranged on the outer periphery of the contact surface 68 and engage into corresponding recesses 98 in the support body 72. Here too, an adequate play, in particular in the radial direction, is provided between the engagement projections 96 and the recesses 98, in order to further retain the possibility of the pivot movement of the contact surface 68 relative to the counter-contact surface 70.

The contact surfaces 68 and 86 as well as the counter-contact surfaces 70 and 88 are preferably manufactured of a hard, wear-resistant material, and in particular the carrier 58, as the case may be, the housing part 52 as well as the support body 72, may be manufactured from a suitably hard material, for example hard metal or ceramic.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A centrifugal pump assembly with at least one impeller (8) and with a thrust bearing (44) situated on a drive shaft defining a rotation axis, said thrust bearing (44) comprising a self-aligning rotating (50) bearing part and a self-aligning stationary (48) bearing part, wherein each of the rotating (50) bearing part and the stationary (48) bearing part includes a bearing surface (56, 78) configured to freely pivot at least in a limited angular range to self-align an angular position of the bearing surface (56, 78) with respect to the rotation axis.

2. The centrifugal pump assembly according to claim 1, wherein the thrust bearing (44) is situated closer to an axial middle of the drive shaft (6) than to axial ends thereof.

3. The centrifugal pump assembly according to claim 2, wherein a rotor (46) of an electric drive motor (2) and the at least one impeller (8) are arranged on the drive shaft (6), wherein the thrust bearing (44) is situated in an axial direction (X) between the rotor and the at least one impeller (8).

4. The centrifugal pump assembly according to claim 1, wherein the thrust bearing (44) is situated on a pressure side of the at least one impeller (8) or of an arrangement of several impellers (8).

5. The centrifugal pump assembly according to claim 1, wherein the thrust bearing (44) is designed as a sliding bearing.

6. The centrifugal pump assembly according to claim 1, wherein the bearing surface (56, 78) of at least one of the rotating (50) bearing part and the stationary (48) bearing part is pivotable about two axes, which are perpendicular to one another and extend normally to the rotation axis, to align the angular position of the bearing surface (56, 78) with respect to the rotation axis.

7. The centrifugal pump assembly according to claim 1, wherein the bearing surface (56, 78) of at least one of the rotating (50) bearing part and the stationary (48) bearing part is attached or supported on a carrier (58, 84) having a spherical contact surface (68, 86) away from the bearing surface (56, 78) and which bears on a corresponding conical counter-contact surface (70, 88) in a sliding manner.

8. The centrifugal pump assembly according to claim 7, wherein the contact surface and counter-contact surface of at least one of the rotating (50) bearing part and the stationary (48) bearing part are held in bearing contact by way of a spring force.

9. The centrifugal pump assembly according to claim 7, wherein engagement elements (92, 94, 96, 98) are arranged on the contact surface (68, 86) and on the counter-contact surface (70, 88), and are engaged to one another for torque transmission.

10. The centrifugal pump assembly according to claim 7, wherein the contact surface (68,86) or the counter-contact surface (70, 88) is manufactured of a ceramic material.

11. The centrifugal pump assembly according to claim 1, wherein one of the bearing parts has a bearing surface (78) which is formed by several individual bearing shoes (76), and the other bearing part (50) has a continuous bearing surface (56), on which the bearing shoes (76) slide.

12. The centrifugal pump assembly according to claim 1, wherein the assembly is designed for delivering a refrigerant.

13. The centrifugal pump assembly according to claim 1, further comprising a canned drive motor (2).

* * * * *